United States Patent Office 2,880,143
Patented Mar. 31, 1959

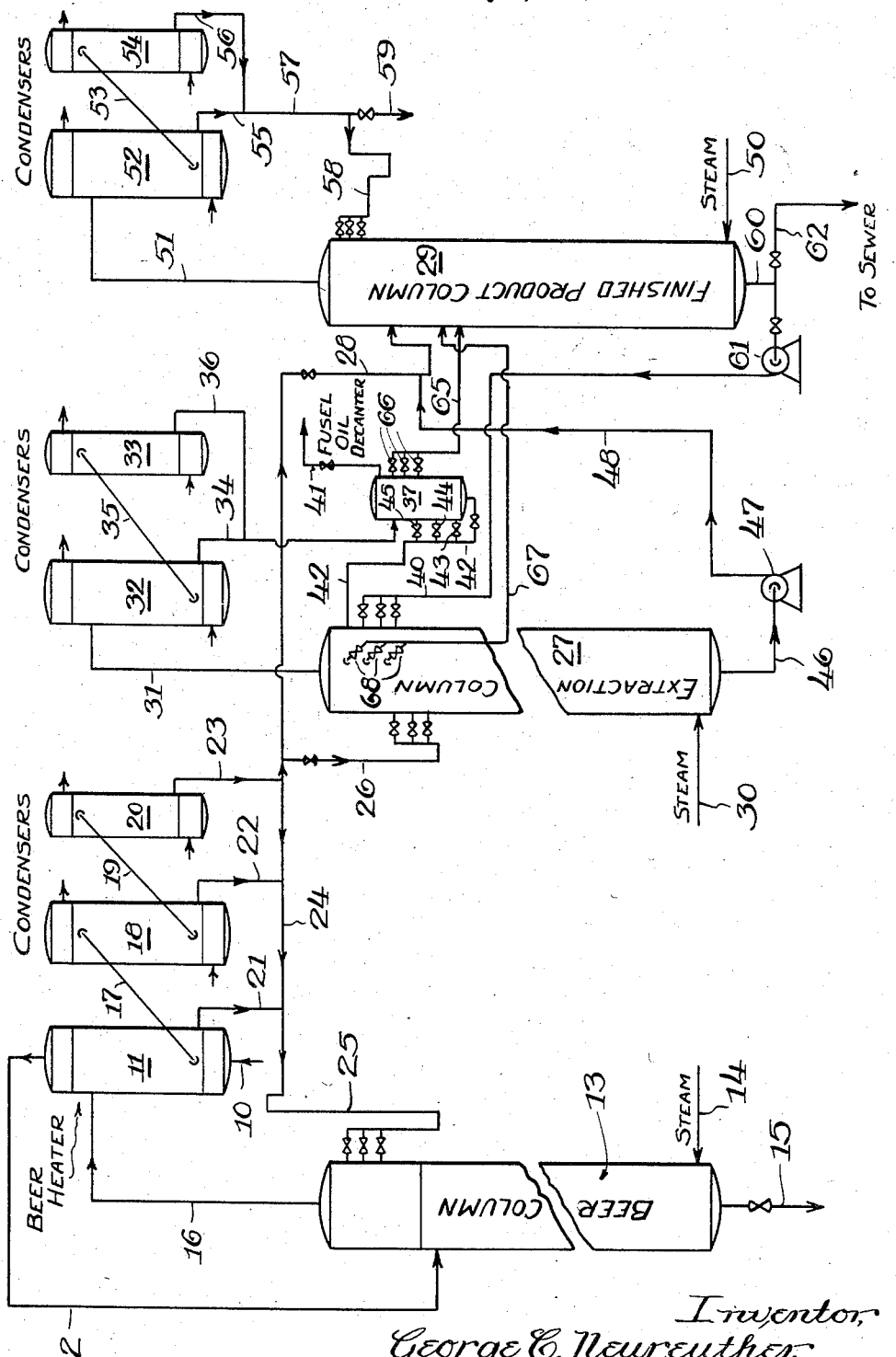

2,880,143

PROCESS FOR PRODUCING WHISKY

George C. Neureuther, Morton, Ill., assignor to Hiram Walker & Sons, Inc., Peoria, Ill.

Application May 5, 1953, Serial No. 353,086

5 Claims. (Cl. 202—39.5)

The present invention relates to a process for the continuous production of whisky from a fermented alcoholic mash or beer, and more particularly to improvements in such processes whereby the composition, body, character and quality of the whisky may be controlled to provide, in continuous operation, a final whisky product of desired characteristics.

Certain of the characteristics of whisky are dependent upon the composition of the beer or alcoholic distillers mash from which the whisky is distilled. The conventional practices for distilling whisky, for the most part, fall under one or the other of two standard procedures. According to one of these procedures, the beer is distilled in a conventional beer still which is operated in such a manner as to hold the proof of the distillate between 110 and 158. The vapors from the beer still pass through a scrubbing chamber, known as a doubler, prior to condensation and removal as the final whisky product. Although it is essentially true that the higher the proof at which the whisky is distilled, the ligter will be the body, it is well recognized that only some of the deleterious ingredients are removed in this manner, since all of the volatile congeners, including fusel oil, eventually distill into the final product, as they can be removed from the system only in the vapor phase, i.e., as an overhead product. The effluent from the doubler is usually returned to the beer still, and consequently the materials scrubbed from the vapors in the doubler are returned to the system.

The second procedure presently practiced embodies most of the steps of the procedure just described, and in addition the product from the beer still undergoes a further step known as redoubling. According to this procedure, the vapors from the beer still are condensed, and the condensate is then charged into a kettle heated by steam coils. The vapors from this kettle are condensed and the condensate is sent to the product tank. When the proof of the distillate from this kettle reaches some predetermined value, usually between 60 and 120, the balance of the material, known as tailings, is sent to a tank to be recharged to the kettle with a new batch from the beer still. Obviously, after a few recycles more and more of the tailings get into the whisky and there is progressively less uniformity in the final whisky product. Consequently, as already mentioned, within very restricted limits, the quality, character and composition of the whisky distillates under either of the present practices are very largely controlled by the characteristics of the beer. In order to secure a desirable final whisky, of uniform character, it is necessary to blend distillates secured by the prior procedures, and in general, to reduce their content of undesired congeners, varying amounts of spirits or substantially pure alcoholic distillates are incorporated in the blends.

By the process of the present invention, I have found that, by the use of conventional distillation equipment, the distillation of a whisky distillate from a beer or mash may be carried out in such a way that the congeners, including heads fractions, tails fractions and fusel oil, may be uniformly and continuously removed from the system in desired proportions, and the composition and quality of the whisky distillate are not changed by recycling, thereby avoiding the lack of uniformity encountered under present practices. These improvements also make it possible to distill a whisky which is not only uniform in quality, but which will also have the desired characteristics of body and bouquet so that the necessity for blending and for incorporating spirits are avoided.

The invention will be more fully understood from the following description, illustrated by the accompanying drawing, wherein the best mode known to me for carrying out the present invention is presented.

Referring to the drawing, beer, or alcoholic distillers mash, containing from about 5% to 8% alcohol by volume and the customary impurities and congeners, such as heads, tails, esters and fusel oil, is pumped through a pipe 10 to a beer heater 11, in which it is heated to a temperature anywhere between 90° and 200° F., preferably 160° to 190° F. The beer thus preheated passes through pipe 12 into the beer column 13 at a point somewhat below the top. The beer column 13 is provided, as is conventional, with perforated or sieve plates (not shown) below the point of introduction of the beer, and with bubble cap plates or wine plates (not shown) above this point. Heat for the distillation is supplied by introduction of live steam at the base of the still through the line 14. In the beer still, the alcohol, together with the congeners, is completely exhausted from the mash or beer. These congeners are made up of the heads (aldehydes and other low boiling fractions), the tails (fusel oil and other high boiling fractions) and esters. The exhausted slop is withdrawn from the base of the still through a draw-off line 15. The vapors from the top of the beer column 13, containing heads, tails and esters, pass out through vapor line 16 to the beer heater 11, where they supply heat to the entering beer and are partially condensed. The supply of steam to the beer column 13 and reflux from condensers 18 and 20 and beer heater 11, through lines 24 and 25 are controlled so that the temperature of the vapors leaving the still is from 188° to 208° F., the vapors having a high alcoholic concentration, suitably in excess of 25% by volume and preferably from 40% to 80% by volume or higher.

Uncondensed vapors from the beer heater 11 pass through line 17 to condenser 18, where further condensation takes place, the uncondensed vapors passing thence through line 19 to final condenser 20. The condensates from beer heater 11 and condensers 18 and 20 pass through lines 21, 22 and 23 respectively to the total condensate line 24. A portion of the mixed condensates passes from line 24 through line 25 to the upper portion of beer column 13 as reflux. The remainder is divided, a portion passing through valved line 26 to the upper portion of an extraction column 27 and the remainder passing through valved line 28 directly into the upper portion of the finished product column 29, as more fully hereinafter described. The proportion of the mixed condensate or total condensate from the beer column 13 which is passed to the extraction column 27 will determine the characteristics of the final whisky distillate product. Other conditions in the system being the same, the larger the proportion of the condensate which is caused to pass to the extraction column, the lighter will be the body of the final whisky distillate product.

The extraction column 27, sometimes designated a de-fusel oil column, has both absorption and stripping functions and is provided with conventional plates, for example, sieve plates or bubble cap plates. Steam for heating the column and for stripping certain constituents from the distillate passing therethrough, is supplied through line 30 at the base of the column to maintain a temperature there of about 208° to 220° F. The temperature of the vapors at the outlet of the column 27 is about 190° to 196° F. In the column 27, heads, tails including fusel oil and some esters are removed from the distillate feed along with alcohol as vapor. These vapors pass out through the line 31 and through condensers 32 and 33. They contain from 10% to 70% alcohol by volume. In the condensers 32 and 33, the vapors from the column 27 are condensed. The condensate from condenser 32 passes out through line 34 and the uncondensed vapors from condenser 32 pass through line 35 to condenser 33. The condensate formed in condenser 33 passes out through line 36 which joins line 34, the total condensate passing into the fusel oil decanter 37. A portion thereof is returned to column 27 through pipe 42, as hereinafter described.

Water for the operation of the extraction column 27 is supplied to the upper portion thereof through the line 40 from a source hereinafter described. The fusel oils, being only partially soluble in water, and volatile with steam when present in excess of their solubility limits, tend to steam-distill out of the column 27 through the line 31, and become concentrated in the distillate from that column which is collected in the fusel oil decanter 37. Here separation of the fusel oil from an aqueous alcohol layer is effected. A desired proportion of the fusel oil, together with any accompanying heads and other congeners, may be withdrawn from the fusel oil decanter 37 through the line 41 and discharged from the system. The aqueous alcoholic layer separated from the distillate from column 27 and fusel oil decanter 37 is returned through the line 42, to the upper portion of the extraction column 27 and serves as reflux therein. The liquid thus returned contains some fusel oils in solution, some alcohol and some of the water-soluble congeners. It is desirable that sufficient fusel oil be maintained in the upper portion of the extraction column 27 to maintain two phases in the reflux liquids in the upper portion of the column and in the fusel oil decanter. In order that sufficient fusel oils may be kept in this portion of the system for this purpose, provision is made for the return of a desired proportion of separated fusel oils from the fusel oil decanter 37 to the column 27 when necessary. For this purpose, and for the return of varying proportions of other congeners as desired, lines 43, 44 and 45 are provided connecting the fusel oil decanter at different levels with the line 42 leading to the upper portion of column 27.

As pointed out hereinbefore, that portion of the total distillate from the column 13 which does not enter the extraction column 27, or return to column 13 as reflux, passes into the finished product column 29 through the line 28. The finished product column 29 is an efficient fractionating column of conventional type, for example, a bubble plate column. The bottoms or effluent from extraction column 27, which contain from 8 to 50% alcohol and are substantially free of congeners, pass out through line 46 and are forced by pump 47 through line 48 into line 28, where they join the beer column distillate entering the finished product column 29. Heat is supplied to the finished product column by supplying steam thereto through line 50 near the base of the column, and a temperature of approximately 220° F. is maintained at the base of this column. The column is operated so as to exhaust all of the alcohol from the liquid supplied to it through the line 28 and to permit the finished product to be withdrawn from the system at the desired alcoholic strength, say for example, 45 to 78% by volume. The temperature at the top of the column is in the range of about 187° to about 200° F. The vapors from column 29 pass out through line 51 to condenser 52, from which uncondensed vapors pass through line 53 to condenser 54, where final condensation takes place. The condensates formed in condensers 52 and 54 pass out through lines 55 and 56 respectively, which connect with a line 57. A portion of the final distillate is returned to the top of column 29 through line 58, to serve as reflux therein. The remainder of this distillate is withdrawn through line 59 as the final whisky distillate. The effluent or bottoms from the finished product column 29 pass out through line 60. This effluent is completely free of alcohol. A portion of this effluent is picked up by pump 61, by which it is forced into the line 40 which discharges into the upper portion of extraction column 27 to maintain the proper conditions for operation therein. The remainder of the effluent or bottoms from finished product column 29 is discharged through line 62 to the sewer.

On occasions, for example, when efficient operation of column 27 requires the supply to it of larger proportions of distillate through line 26 than is desirable from the standpoint of the properties to be secured in the final whisky distillate, it is advantageous to provide means for increasing the proportions of congeners introduced into column 29. For this purpose, a line 65 may be provided between the fusel oil decanter 37 and an intermediate point in column 29, with valved connections 66 to the fusel oil decanter 37 at different levels. In this way any desired proportions of the aqueous or of the supernatant layer or both may be transferred from the fusel oil decanter to the column 29 and the congeners present therein thus incorporated in the final whisky distillate.

Additional means for controllably increasing the proportions of congeners in the whisky distillate may also be provided. Thus, a line 67 may be provided leading from the extraction column 27 to the upper portion of column 29, the line 67 being provided with valved connections 68 at different levels to plates in the upper portion of column 27 for the withdrawal of reflux therefrom. The congeners are present in increased proportions in these plates. Such amounts of these reflux condensates as are found desirable may be introduced into column 29 and the associated congeners are thereby incorporated in the final whisky distillate.

By operating in accordance with the present invention, the composition and quality of the final whisky distillate may be adequately controlled within broad limits and a final whisky distillate of the desired characteristics may be obtained in continuous operation so that no blending or cutting with spirits is required. Thus, by control of the relative proportions of the total distillate product from the beer column going to the extraction column and to the finished product column, the desired proportions of heads, tails and fusel oils may be secured in the final whisky distillate and at the same time all of the alcohol initially present in the beer or mash supplied to the beer column appears in the final whisky distillate. If insufficient proportions of the congeners or of any group of them is incorporated in the final whisky distillate in this manner, it may be supplied by the transfer to the finished product column of condensate from selected levels of the fusel oil decanter or of reflux from the extraction column, as hereinbefore described. The objectionable recycling of prior methods of operation and the accompanying concentration of congeners and lack of uniformity in products which result from such recycling are avoided. The heads and tail fractions are continuously and uniformly removed in the desired proportions, so that the composition and quality of the whisky are maintained uniform.

Although the invention has been described in connection with the details of a specific example thereof, it is to be understood that these details are not to be regarded as limitations upon the scope of the invention except insofar as included in the accompanying claims.

I claim:

1. In a continuous distillation process for producing a whisky distillate which comprises the steps of introducing a fermented alcoholic mash, which contains alcohol and also congeners, including fusel oils, into a beer distilling column, supplying heat to said column to distill therefrom vapors containing alcohol and associated congeners, the alcohol content of said vapors being such as to form a condensate of high alcohol content, condensing the distilled vapors, and subjecting the condensate of said distilled vapors to a further distillation to form a final whisky distillate, that improvement comprising dividing the total distillate into two fractions, introducing one of said fractions continuously into an extraction column to the upper portion of which water is supplied as an extraction fluid, heating said extraction column to drive off therefrom vapors containing the fusel oil content of the distillate feed to said extraction column to provide a fusel oil distillate, a first portion of which is for delivery to a final rectifying column and a second portion of which is for return to said extraction column, discharging the remaining fraction of the total distillate from the beer distilling column into said final rectifying column and adding thereto the effluent or bottoms from the extraction column together with said first portion of fusel oil distillate to form in said further distillation a final whisky distillate of reduced content of higher and lower boiling congeners and fusel oil, said content being controlled by the foregoing treatment independently of the content of congeners in said fermented alcohol mash.

2. In a continuous distillation process for producing a whisky distillate which comprises the steps of introducing a fermented alcoholic mash, which contains alcohol and also congeners, including fusel oils, into a distilling column, supplying heat to said column to distill therefrom vapors containing alcohol and associated congeners, the alcohol content of said vapors being such as to form a condensate of from 40 to 80 volume percent alcohol or higher, condensing the distilled vapors, and subjecting the condensate of said distilled vapors to a further distillation to form a final whisky distillate, that improvement comprising dividing the total distillate into two fractions, introducing one of said fractions continuously into an extraction column to the upper portion of which water is supplied as an extraction fluid, heating said extraction column to drive off therefrom vapors containing the fusel oil content of the distillate feed to said extraction column, condensing the vapors from said extraction column to form a distillate containing said fusel oils, separating said distillate into a fusel oil fraction and an aqueous alcoholic fraction containing dissolved fusel oils, returning the latter to the extraction column, discharging the remaining fraction of the total distillate from the beer column into a final rectifying column, adding thereto the effluent or bottoms from the extraction column, and subjecting the mixed liquid in said rectifying column continuously to redistillation to form a final whisky distillate of reduced content of higher and lower boiling congeners and fusel oil, whereby substantially the entire alcohol content of the fermented mash or beer, apart from that removed with the separated fusel oils, is included in said final whisky distillate.

3. In a continuous distillation process for producing a whisky distillate which comprises the steps of introducing a fermented alcoholic mash, which contains alcohol and also congeners, including fusel oils, into a distilling column at an intermediate point, supplying heat to said column to distill therefrom vapors containing alcohol and associated congeners, the alcohol content of said vapors being such as to form a condensate of from 40 to 80 volume percent alcohol, condensing the distilled vapors, and subjecting the condensate of said distilled vapors to a further distillation to form a final whisky distillate, that improvement comprising dividing the total distillate into two fractions, introducing one of said fractions continuously into an extraction column to the upper portion of which water is supplied as an extraction fluid, heating said extraction column to drive off therefrom vapors containing a portion of the alcoholic content of the distillate feed to said extraction column, together with the entire fusel oil content thereof and associated congeners, condensing the vapors from said extraction column to form a distillate containing said fusel oils, separating said distillate into a fusel oil fraction and an aqueous alcoholic fraction containing dissolved fusel oils, returning the latter to the upper portion of said extraction column together with sufficient fusel oil to maintain a two phase system in said distillate, discharging the remaining fraction of the total distillate from the beer column into a final rectifying column, adding thereto the effluent or bottoms from the extraction column, and subjecting the mixed liquid in said rectifying column continuously to redistillation to form a final whisky distillate of reduced content of higher and lower boiling congeners and fusel oil, and having an alcohol content of 45 to 78 volume percent, whereby substantially the entire alcohol content of the fermented mash or beer, apart from that removed with the separated fusel oils, is included in said final whisky distillate.

4. The process of claim 2, wherein reflux condensate from a selected plate in the upper portion of the extraction column is introduced into the final rectifying column, whereby the content of congeners in the final whisky distillate is increased.

5. The process of claim 2, wherein proportions of selected fractions of the distillate from the extraction column are introduced into the final rectifying column, whereby the content of congeners in the final whisky distillate is increased.

References Cited in the file of this patent

UNITED STATES PATENTS

| | | |
|---|---|---|
| 887,793 | Guillaume | May 19, 1908 |
| 996,328 | Guillaume | June 27, 1911 |
| 2,080,167 | Da Valle | May 11, 1937 |
| 2,148,846 | Von Retze | Feb. 28, 1939 |
| 2,358,272 | Willkie | Sept. 12, 1944 |
| 2,383,176 | Willkie | Aug. 21, 1945 |
| 2,602,744 | Neureuther | July 8, 1952 |

FOREIGN PATENTS

| | | |
|---|---|---|
| 17,040 | Australia | Nov. 26, 1928 |